April 13, 1965     H. E. REICHART     3,177,840
AMPHIBIOUS VEHICLE
Filed March 25, 1963
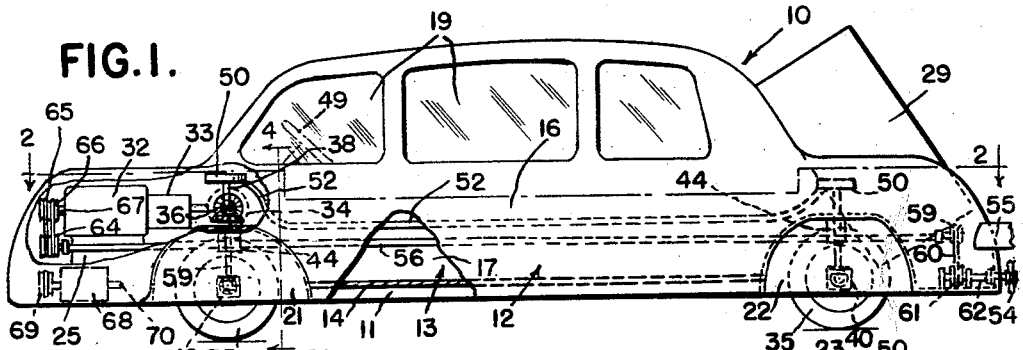
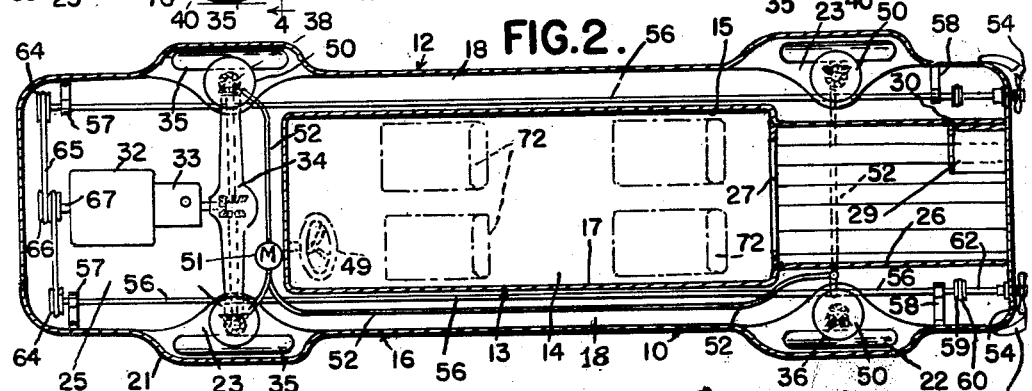
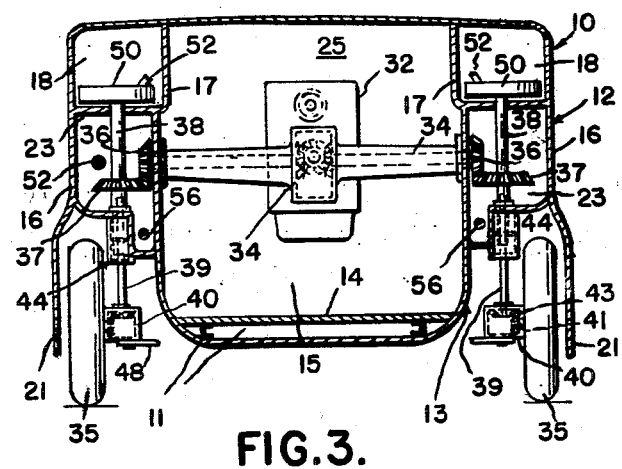
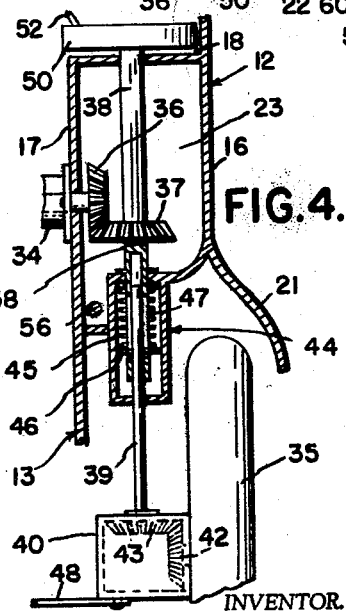
INVENTOR.
HERMAN E. REICHART
BY *Whittemore Hulbert &*
*Belknap*
ATTORNEYS

# United States Patent Office 3,177,840
Patented Apr. 13, 1965

3,177,840
AMPHIBIOUS VEHICLE
Herman E. Reichart, 2810 W. Long Lake Road,
Orchard Lake, Mich.
Filed Mar. 25, 1963, Ser. No. 267,438
7 Claims. (Cl. 115—1)

The present invention relates to improvements in an amphibious vehicle, by reason of which the vehicle is capable of performance, both when water-borne or on the land, which is far better than that of heretofore proposed joint purpose vehicles. That is, when afloat it presents less frictional drag tending to reduce speed and/or maneuverability, while on land it is capable of duplicating the speed and roadability of existing pleasure vehicles, which it also resembles closely in appearance.

To the foregoing ends, it is an object of the invention to provide a pleasure-type vehicle suitable to the needs of town and suburban transportation, as distinguished from present military-type amphibious craft, wherein the sheet metal body of the vehicle, as built to an appropriate rigid chassis structure, affords an entirely sealed hull, free of access doors or like openings beneath or coming close to the normal water level in which the vehicle floats; in which body all of the major engine, transmission, differential, shafting and like components are wholly enclosed, only an absolute of such components extending through sealed openings in the hull-type body to the exterior of the latter for driving connection to wheels and propellers.

Thus, an absolute minimum of structure is exposed to set up a hydraulic drag detrimental to the speed and maneuverability of the vehicle, whether on land or afloat.

In further accordance with the invention, the transverse space normally represented by the thickness of the hollow, externally and internally paneled doors and pillars of a conventional automobile is utilized to accommodate front-to-rear propeller shafts driven from the usual type of internal combustion engine or other prime mover. Similarly, power take-off shafting driven from a transversely disposed differential of known type is housed within sealed spaces in the general line of these longitudinal zones, as well as appropriate brakes for the four wheels of the vehicle. None of these parts is externally exposed, save for the ultimate drive connection to wheels and propellers, in a necessary manner.

A further object is to provide an amphibious, pleasure-type vehicle of the sort described in which, by reason of the wholly sealed side wall nature thereof, entry to and exit from the car is at the front or back thereof (whichever end does not receive the engine and other primary drive structures). As herein shown, a rear door is provided, pivoted on an upwardly extending axis in what would be the normal trunk area of a conventional automobile. Yet this door and its opening are within the hull outline of the vehicle; and entry or exit are had by stepping upon the usual rear bumper. The thus-modified trunk area may be utilized as an external deck for fishing.

Generally, it is an object of the invention to provide a pleasure-type amphibious vehicle which resembles in appearance the body design of existing land vehicles, the nature of the arrangements in regard to the body, for purposes to be described, being such that its design may be kept apace with future design trends. Not only does the improvement provide a vehicle which is stably maneuverable on land and afloat, but also one in which great buoyancy and buoyant stability exists, due to the desired sealed compartmentization of the body of the structure, with attendant desired safety. Characterized as it is by an end access to the passenger compartment, the latter may be of increased roominess for recreation purposes, and its flooring is flat throughout, free from the usual transmission and propeller shaft "humps" of known vehicles, and with desirable head room throughout the passenger area.

The foregoing as well as other objects will become more apparent as this description proceeds, especially when considered in connection with the accompanying drawings illustrating the invention, wherein:

FIG. 1 is side elevational view, partially broken away, showing in a schematic manner the improved amphibious vehicle of the invention;

FIG. 2 is a view in horizontal section along line 2—2 of FIG. 1;

FIG. 3 is a view of the vehicle in transverse vertical section; and

FIG. 4 is an enlarged scale fragmentary view in vertical section along a line corresponding to line 4—4 of FIG. 1.

It is to be understood that the present invention resides primarily in an improved general arrangement of driving and control agencies of the vehicle relative to the wall structure of the vehicle body, rather than any particular structural characteristics of such agencies, themselves. Per se, they may be of known types, modified only slightly for their particular adaptation to the purposes of the invention. Thus, no attempt has been made to actually depict structural features, the drawings being highly schematic in nature, and intended to show in a general way only suggested mechanisms, on the understanding that equivalent structures may be substituted. The improved vehicle, generally designated 10, may be considered to comprise a suitable rigid frame or chassis 11 to which is rigidly mounted in a known manner a sheet metal body structure 12. Frame 11 and body 12 may be of a unitized, welded construction in accordance with existing manufacturing practice, and no attempt has been made to fully illustrate specific features.

It is, however, of the essence of the invention that the body 12, as constituted by its outer and inner shell members or walls, shall be of a continuous sheet metal or like water-impervious wall construction, devoid of side doors and providing a sealed inner hull part 13, which may be appropriately floored by a rigid deck panel 14 (FIG. 3) enclosing a passenger compartment 15.

The body 12 is completed by a further, sealed and attractively finished external shell 16 occupying the position of the conventional outer side wall panel structure of the conventional automobile body, but, again lacking side doors. It is to be observed by reference to FIGS. 2 and 3 that the spaces between the outer shell 16 and the respective upright side walls 17 of the inner hull structure 13 will, in general, correspond to the internal door spaces of the conventional automotive vehicle; and these spaces, designated 18, and the upper portions of the body 12 thereabove may correspondingly receive sliding window panels 19, and the usual type of control and operating mechanisms used for the same (not shown).

The body 12 is formed to provide front and rear wheels 21, 22, respectively, above each of which the body further affords a sealed space 23 for a purpose to be described. This is, in effect, a continuation of the space 18.

A forward extension of the sealed body hull 13 provides an equally well sealed engine compartment 25; while a rear extension 26 of the hull structure similarly affords a sealed rear deck area. Access to and egress from the internal passage compartment or space 15 of the hull body 13 are had through a rear opening 27 of appropriate height and width. This deck area of the vehicle may be closed by an appropriate door 29 of appropriate contour, hinged to the body structure by an appropriate hinge 30 extending forwardly and upwardly along one side thereof, or a pair of like door panels hinged on opposite side hinges.

When a door is thrown open, per FIG. 1, the rear deck affords a suitable area for fishing.

An appropriate engine 32 is shown mounted in the forward compartment 25, being mounted to the chassis structure 11 in a suitable manner (not shown). This engine will be assumed to be equipped with all of the usual automotive appurtenances, including fan, pump, generator and other rotative components of known sort (not shown). A selective transmission 33 drivingly connects the engine toward the rear with a known type of differential 34 which, like the engine and transmission are suitably supported within the engine compartment 25; and a suggested bevel gear type of drive for the front wheels 35 is shown.

Thus, the respective aligned output shafts of differential 34 may extend outwardly of the walls of body hull 13 into the sealed spaces 23, where they are equipped with power take-off bevel gears 36 in driving mesh with further bevel gears 37, each secured on upright tubular shafts 38.

The thus driven shafts 38 are provided with a suitable splined or like type of drive connection to the respective telescoped shafts 39, which latter each extend upwardly from a gear box 40 which may be considered to be a part carried by the axle structure of the ground wheels 35. The latter have bevel gears 42 rotating therewith and meshing with bevel gears 43 on the upright shafts 39, as shown best in FIG. 4.

An independent spring suspension for each of the four wheels 35 is suggested at 44, comprising, for example, a heavy duty coil spring 45 acting beneath the part of the body structure which defines the above-well spaces 23 and a drive pin 46 extending through shaft 39 and received in upright slots 47 of the tubular shaft 38.

It is repeated that the general arrangements herein shown are highly schematic and solely for the purpose of illustration; and other types of driving connection to the wheels which will afford the necessary spring of the body 12 and chassis provision relative thereto will suggest themselves to those skilled in the art. Similarly, the front wheels 35 are shown as being steerable by linkage parts 48 connected to the respective gear boxes 40, and in turn operatively connected to the steering wheel 49 (FIGS. 1 and 2) and, again, no attempt has been made to show details of such a linkage arrangement.

Only the forward pair of ground wheels 35 are driven and steered by provisions of the general sort referred to; however, each of the four upright shafts 38 is shown as brought upwardly above the bevel gears 36, 37, where it is equipped with a suitable brake 50 of a hydraulic or electrical type enclosed in the space 18 (FIG. 3). As herein shown, brakes 50 are of the hydraulic type, operable by a suitable hydraulic motor 51 adjacent the rear of engine compartment 25, the respective brakes being supplied with hydraulic fluid through connecting hydraulic conduits 52.

Thus, it is seen that practically all of the operating or driving instrumentalities of the vehicle 10 are housed within watertight sealed spaces, including brakes 50 and power take-off means 36, 37, 38, except for the parts most directly connected to the wheels 35 at the gear boxes 40. They thus present little or no frictional drag when the vehicle is afloat. The hydraulic brake conduitry 52 or its electrical equivalent is brought to the rear through one or the other of the side body spaces 18, 23, spaces usually represented by the hollow doors of the automotive body.

It is seen that the thoroughly sealed and compartmented nature of the body construction affords great buoyant stability afloat, as well as a highly desirable safety factor.

The side spaces 18 and 23 are also utilized to accommodate the provisions of the invention for the drive of dual propellers 54, which project rearwardly of either side of the body 12 beneath the usual rear bumper 55. Elongated drive shafts 56 extend through the spaces 18 and 23, being journaled in fixed front and rear brackets 57, 58. At its rear end, each shaft 56 carries a pulley or sprocket 59 which is belt or chain connected at 60 to a further pulley or sprocket 61 on a bracket-journaled propeller shaft 62. A propeller 54 is fixedly mounted externally of the body on each of the shafts 62.

Forwardly of the respective engine compartment brackets 57, the drive shafts 56 each carry a pulley or sprocket 64 (FIGS 1 and 2) these being respectively connected by a belt or chain 65 with one of two pulley or sprocket portions of a double pulley or sprocket 66 which is fixed to a forwardly extending output shaft 67 of the engine 32. This would correspond to the forward end of the usual crank shaft, from which auxiliary drives are conventionally taken.

Thus a suitable shaft drive for the propellers 54 is provided. However, other types of drive than a mechanical one are contemplated for the propellers; and FIG. 1 suggests in dot-dash line such an alternative. It is in the form of a hydraulic pump 68, likewise driven by a sprocket 69 belt or chain connected to the engine output shaft 67, and provided with a hydraulic pressure output line or conduit 70. Such line or conduit might be connected to an appropriate hydraulic motor (not shown) for each of the propeller shafts 62 for a hydraulic pressure drive of propellers 54. Pneumatic or electrical drives might also be resorted to, the basic contemplated idea of the invention that power transmitting connections, whether mechanical, hydraulic, pneumatic or electrical, will be made to the rear through the side wall spaces 18 or 23, just as the propeller shafts are externally disposed in such spaces.

Coupled with this concept is that of an amphibious vehicle body which is totally enclosed and jointless at the sides, and otherwise watertight sealed for a distance well above the normal water line when the vehicle is afloat; and the further concept of a rear entry access door forwardly of a trunk-area platform, it being understood that the vehicle is equally well sealed up to and above the water line in these front and rear zones. One may enter the vehicle by stepping upon the rear bumper 55, thence onto the rear deck. In an alternative embodiment in which the vehicle may have a rear drive arrangement of its prime mover and a differential, entry will be from the front, in a suitable manner, onto a forward deck zone normally covered by the usual hood provisions. Regardless of the motor mount, appropriate means will be provided for the intake of radiator cooling air well above the water level, and means for ready access to all parts for the purpose of servicing. The engine exhaust pipe (not shown) may be brought through one of the sealed side spaces 23, in the manner of the propeller shafts 56.

FIG. 2 shows, in dot-dash line, an arrangement of bucket-type passenger seats 72 in the passenger space 14 within the inner body wall 13. If desired, seating might be alternatively arranged along one or both longitudinal sides of the space 14, permitting additional area for card playing or other recreation.

It is therefore seen that the invention provides an improved pleasure type of amphibious vehicle capable of road performance fully equal to that of any present day medium priced automobile, and of performance afloat bettering that of presently available amphibious vehicles. The vast majority of necessary operating parts or connections are fully enclosed and sealed against water, leaving only the absolutely necessary drive and brake connections exposed to water, but still in wheel areas which are themselves laterally shielded. The result is an absolute minimum of water or air friction, leading to the improved nature of the performance mentioned above. Thus, though as mentioned several times above, the mechanical arrangements are very schematically shown, yet they are sufficient in nature to make possible a full understanding of the invention; and it is always contemplated that equivalent variation of the illustrated structure may be employed.

The disposition of propeller drive shaft, brake conduitry and the like, and the use of a front or rear access opening to the passenger compartment 15 enables the latter to be of desirable roominess and flat-floored throughout. When afloat, the vehicle is a highly buoyant, stable and safe one, as mentioned above.

What I claim as my invention is:

1. An amphibious vehicle having the general external appearance of a pleasure automobile, comprising a sealed hull and body structure providing a passenger compartment between upright, laterally spaced outer side walls, the walls being of continuous external sheet construction, from the bottom of the same to above the normal water level when afloat, said walls coacting with the remainder of said structure in defining sealed, laterally enclosed side spaces which extend a substantial distance in a front-to-rear endwise direction of the vehicle, said vehicle having a four-wheeled unit supporting said sealed hull and body structure for the land propulsion thereof, a prime mover enclosed by said structure, brakes disposed in said spaces and operatively connected to each of the four wheels of said unit, operating connections for said brakes at least in part extending in said endwise direction through said laterally enclosed spaces, a propeller rotatively mounted on said hull and body structure, and drive means operatively connecting said prime mover with said propeller, including a connection from the former to the latter at least in part extending through a laterally enclosed space.

2. An amphibious vehicle having the general external appearance of a pleasure automobile, comprising a sealed hull and body structure providing a passenger compartment between opposed pairs of upright, laterally spaced side walls, the outermost wall of each of the respective pairs being of continuous external sheet construction, from the bottom of the same to above the normal water level when afloat, and coacting with the remainder of said structure in defining sealed, laterally enclosed side spaces between said walls of the respective pairs, which spaces extend a substantial distance in a front-to-rear endwise direction of the vehicle, said vehicle having a four-wheeled unit supporting said sealed hull and body structure for the land propulsion thereof, a prime mover enclosed by said structure, brakes disposed in said respective spaces and operatively connected to each of the four wheels of said unit, operating connections for said brakes at least in part extending in said endwise direction through said laterally enclosed spaces, a propeller rotatively mounted on said hull and body structure, and drive means operatively connecting said prime mover with said propeller, including a connection from the former to the latter at least in part extending through one of said laterally enclosed spaces, said sealed hull and body structure having an access opening to said passenger compartment at one of the front-to-rear ends of the latter.

3. An amphibious vehicle having the general external appearance of a pleasure automobile, comprising a sealed hull and body structure providing a passenger compartment between opposed pairs of upright, laterally spaced side walls, the outermost wall of each of the respective pairs being of continuous sheet construction, from the bottom of the same to above the normal water level when afloat, and coacting with the remainder of said structure in defining sealed, laterally enclosed side spaces between said walls of the respective pairs, which spaces extend a substantial distance in a front-to-rear endwise direction of the vehicle, said vehicle having a four-wheeled unit supporting said sealed hull and body structure for the land propulsion thereof, a prime mover enclosed by said structure adjacent one end of said compartment and having power take-off means for said four-wheeled unit disposed in said sealed, laterally enclosed spaces, a differential mechanism within said structure having driving connections to said prime mover and one pair of the wheels of the vehicle for the land drive of the latter from the prime mover, brakes disposed in said respective spaces and operatively connected to each of the four wheels, operating connections for said brakes, said brake operating connections at least in part extending in said endwise direction through said laterally enclosed spaces, propellers rotatively mounted on said hull and body structure adjacent opposite sides thereof, and drive means operatively connecting said prime mover with said propellers, including connections from the former to the latter at least in part extending through said laterally enclosed spaces.

4. An amphibious vehicle having the general external appearance of a pleasure automobile, comprising a sealed hull and body structure providing a passenger compartment between opposed pairs of upright, laterally spaced side walls, the outermost wall of each of the respective pairs being of continuous sheet construction, from the bottom of the same to above the normal water level when afloat, and coacting with the remainder of said structure in defining sealed, laterally enclosed side spaces between said walls of the respective pairs, which spaces extend a substantial distance in a front-to-rear endwise direction of the vehicle, said vehicle having a four-wheeled unit supporting said sealed hull and body structure for the land propulsion thereof, a prime mover enclosed by said structure adjacent one end of said compartment and having power take-off means for said four-wheeled unit disposed in said sealed, laterally enclosed spaces, a differential mechanism within said structure having driving connections to said prime mover and one pair of the wheels of the vehicle for the land drive of the latter from the prime mover, brakes disposed in said respective spaces and operatively connected to each of the four wheels, operating connections for said brakes, said brake operating connections at least in part extending in said endwise direction through said laterally enclosed spaces, propellers rotatively mounted on said hull and body structure adjacent opposite sides thereof, and drive means operatively connecting said prime mover with said propellers, including connections from the former to the latter at least in part extending through said laterally enclosed spaces, said sealed hull and body structure having an access opening to said passenger compartment at one of the front-to-rear ends of the latter.

5. An amphibious vehicle having the general external appearance of a pleasure automobile, comprising a sealed hull and body structure providing a passenger compartment between upright, laterally spaced outer side walls, the walls being of continuous external sheet construction, from the bottom of the same to above the normal water level when afloat, said walls coacting with the remainder of said structure in defining sealed, laterally enclosed side spaces, said vehicle having a four-wheeled unit supporting said sealed hull and body structure for the land propulsion thereof, a prime mover enclosed by said structure, brakes disposed in said spaces and operatively connected to each of the four wheels of said unit, a propeller rotatively mounted on said hull and body structure, and drive means operatively connecting said prime mover with said propeller, including a connection from the former to the latter at least in part extending through a laterally enclosed side space.

6. An amphibious vehicle having the general external appearance of a pleasure automobile, comprising a sealed hull and body structure providing a passenger compartment between upright, laterally spaced outer side walls, the walls being of continuous external sheet construction, from the bottom of the same to above the normal water level when afloat, said walls coacting with the remainder of said structure in defining sealed, laterally enclosed side spaces, said vehicle having a four-wheeled unit supporting said sealed hull and body structure for the land propulsion thereof, a prime mover enclosed by said structure and having power take-off means for said four-wheeled unit disposed in said sealed, laterally enclosed side spaces, brakes disposed in said spaces and operatively connected to each of the four wheels of said unit, a propeller rotatively mounted on said hull and body structure, and drive means operatively connecting said prime mover with said propeller, including a connection from the former to the latter at least in part extending through a laterally enclosed side space.

7. An amphibious vehicle having the general external appearance of a pleasure automobile, comprising a sealed hull and body structure providing a passenger compartment between upright, laterally spaced outer side walls, the walls being of continuous external sheet construction, from the bottom of the same to above the normal water level when afloat, said walls coacting with the remainder of said structure in defining sealed, laterally enclosed side spaces, said vehicle having a four-wheeled unit supporting said sealed hull and body structure for the land propulsion thereof, a prime mover enclosed by said structure and having power take-off means for said four-wheeled unit disposed in said sealed, laterally enclosed side spaces, brakes disposed in said spaces and operatively connected to each of the four wheels of said unit, operating connections for said brakes at least in part extending in said endwise direction through said laterally enclosed spaces, a propeller rotatively mounted on said hull and body structure, and drive means operatively connecting said prime mover with said propeller, including a connection from the former to the latter at least in part extending through a laterally enclosed side space.

References Cited by the Examiner
UNITED STATES PATENTS 2,350,037  5/44  Hofheins et al. _____ 115—1
2,406,290  8/46  Hait _____ 115—1

FERGUS S. MIDDLETON, *Primary Examiner.*